United States Patent
Bruflodt et al.

(10) Patent No.: US 12,427,974 B2
(45) Date of Patent: Sep. 30, 2025

(54) MULTIPLE MODE BODY SWING COLLISION AVOIDANCE SYSTEM AND METHOD

(71) Applicant: DEERE & COMPANY, Moline, IL (US)

(72) Inventors: Rachel Bruflodt, Dubuque, IA (US); Giovanni A Wuisan, Epworth, IA (US); Michael Kean, Maquoketa, IA (US); Brett S Graham, Dubuque, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 17/544,233

(22) Filed: Dec. 7, 2021

(65) Prior Publication Data
US 2023/0174055 A1    Jun. 8, 2023

(51) Int. Cl.
*B60W 30/09*    (2012.01)
*B60W 10/04*    (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 30/09; B60W 10/04; B60W 10/20; B60W 2300/44; B62D 15/0265; B62D 11/02
(Continued)

(56) References Cited

U.S. PATENT DOCUMENTS

| | | | |
|---|---|---|---|
| 2004/0193374 A1* | 9/2004 | Hac | G08G 1/166 701/301 |
| 2014/0229069 A1* | 8/2014 | Akiyama | B62D 6/002 701/41 |

(Continued)

FOREIGN PATENT DOCUMENTS

| | | | | |
|---|---|---|---|---|
| CN | 102322080 A | * | 1/2012 | E02F 3/844 |
| DE | 102020210159 A1 | | 3/2021 | |
| DE | 102021201728 A1 | | 9/2021 | |

OTHER PUBLICATIONS

German Search Report issued in application No. 102022208632.5 dated Mar. 13, 2025, 10 pages.

*Primary Examiner* — Angela Y Ortiz
*Assistant Examiner* — Aarron E Santos
(74) *Attorney, Agent, or Firm* — Taft Stettinius & Hollister LLP; Stephen F. Rost

(57) ABSTRACT

A body swing collision avoidance system and method for a machine with steerable traction devices for moving the machine. Sensors monitor obstacles around the machine. A commanded body swing path is calculated based on operator steering commands. If an obstacle is in the commanded body swing path, the system automatically adjusts the steering commands to avoid collision with the obstacle. A time to collision can be calculated, and the steering commands adjusted only when it is below a threshold. Adjusting the steering commands to avoid collision can include determining propel and steer components based on the steering commands; and if propel is greater than a threshold then adjusting the steering commands to adjust the swing path to avoid collision; and if propel is less than the threshold then adjusting the steering commands to slow the machine to avoid collision.

20 Claims, 6 Drawing Sheets

(51) Int. Cl.
    *B60W 10/20*    (2006.01)
    *B62D 11/02*    (2006.01)
    *B62D 15/02*    (2006.01)
(52) U.S. Cl.
    CPC ..... *B62D 15/0265* (2013.01); *B60W 2300/44* (2013.01); *B62D 11/02* (2013.01)
(58) Field of Classification Search
    USPC .......................................................... 701/26
    See application file for complete search history.

(56)            References Cited

U.S. PATENT DOCUMENTS

2014/0277675 A1*  9/2014  Anderson .............. A01B 69/00
                                                    700/114
2017/0073935 A1*  3/2017  Friend ..................... E02F 9/265
2017/0203757 A1*  7/2017  Ohbayashi .......... B60W 30/085
2019/0032305 A1*  1/2019  Hageman ................. E02F 3/847
2020/0048871 A1*  2/2020  Nishizawa ............. B60Q 9/008

* cited by examiner

MULTIPLE MODE BODY SWING COLLISION AVOIDANCE SYSTEM AND METHOD

FIELD OF THE DISCLOSURE

The present disclosure relates to machine collision avoidance, and more specifically relates to collision avoidance between the body of the machine with surrounding obstacles during maneuvering.

BACKGROUND

Machines often have to be steered close to various obstacles and barriers. Some small machines, such as compact track loaders or skid steers, frequently need to be maneuvered very close to walls or objects in order to work efficiently. This makes automatic collision avoidance challenging to implement for various machines, since the collision avoidance system must prevent the machine from contacting obstacles while still allowing it to get close to obstacles.

Machines can have various drive and steering mechanisms, for example front, rear, all wheel drive and/or wheel steering, etc. As one example, a differentially steered machine, such as a compact track loader or skid steer, typically has separate drive assemblies for the wheels or tracks on each side of the machine. The motion or trajectory of a machine can be thought of as having a propel, radial or straight line forward/backward component, and a steer, transverse or lateral component that are commanded by the operator. When a machine is steered or rotated, the front or rear end of the machine will swing out in the opposite direction of the other end. In addition, one end of the machine, usually the rear, is typically less visible to the operator than the other. Further, when the machine is being moved in one direction, the operator may be focusing their attention in that direction and can sometimes swing the opposite end of the machine into walls or other obstacles while trying to steer. This is also true for machines that articulate, and for implements attached to a machine, where swinging or steering one end of the machine or the implement can swing the other end of the machine or the implement into an unnoticed obstacle during the swinging, steering or articulation motion.

It would be desirable to have a body swing collision avoidance system that detects the presence of obstacles in the path of the body swing of a machine or implement, and that prevents or mitigates collision of the machine or implement with the obstacles. The body swing collision avoidance system could prevent or mitigate collision with the obstacle by, for example, stopping machine motion before collision with the obstacle or by overriding the operator's steering command so as to avoid collision with the obstacle. The specific behavior of the body swing collision avoidance system could depend on the operator's current control inputs from which the operator's intent may be inferred.

SUMMARY

A body swing collision avoidance method is disclosed for a machine having steerable traction devices for moving the machine. The method includes monitoring obstacles around the machine using sensors; monitoring operator steering commands for the steerable traction devices; calculating an operator commanded body swing path for the machine based on the operator steering commands; determining whether an obstacle detected by the sensors is in the operator commanded body swing path; and if the obstacle is in the operator commanded body swing path, automatically adjusting the operator steering commands to avoid collision with the obstacle. Automatically adjusting the operator steering commands to avoid collision with the obstacle can include determining a time to collision with the obstacle based on the operator steering commands; and if the time to collision with the obstacle is below a time threshold, automatically adjusting the operator steering commands to avoid collision with the obstacle.

Automatically adjusting the operator steering commands to avoid collision with the obstacle can include determining operator requested propel and steer components for the machine based on the operator steering commands. If the operator requested propel component is greater than or equal to a propel threshold, then the method can include adjusting the operator steering commands to adjust the body swing path to avoid collision with the obstacle. If the operator requested propel component is less than the propel threshold, the method can include adjusting the operator steering commands to slow the machine to avoid collision with the obstacle.

Adjusting the operator steering commands to adjust the body swing to avoid collision with the obstacle can include determining a calculated body swing path close to the operator commanded body swing path that avoids collision with the obstacle; maintaining the operator requested propel component; calculating a steer component for the calculated body swing path; and adjusting the operator steering commands to implement the operator requested propel component and the calculated steer component.

Adjusting the operator steering commands to slow the machine to avoid collision with the obstacle can include maintaining the ratio of the operator requested steer component and the operator requested propel component; and reducing both the operator requested steer component and the operator requested propel component to avoid collision with the obstacle.

Adjusting the operator steering commands to adjust the body swing to avoid collision with the obstacle can include continuously monitoring the operator steering commands for the steerable traction devices; continuously calculating the operator commanded body swing path for the machine based on the latest operator steering commands; and continuously determining whether the obstacle is in the latest operator commanded body swing path If the obstacle is in the latest operator commanded body swing path, the method can also include continuously determining a latest calculated body swing path close to the latest operator commanded body swing path that avoids collision with the obstacle; continuously calculating a steer component for the latest calculated body swing path; and continuously adjusting the operator steering commands to implement the operator requested propel component and the latest calculated steer component.

The method can also include checking for an operator override command; and when the operator override command is detected, not adjusting the operator steering commands to avoid collision with the obstacle.

A body swing collision avoidance system is disclosed for a machine that has steerable traction devices to move the machine, and that has a vehicle controller. The body swing collision avoidance system includes sensors and a body swing controller. The sensors detect obstacles around the machine. The body swing controller monitors operator steering commands for the steerable traction devices, calculates an operator commanded body swing path for the machine based on the operator steering commands, and determines whether an obstacle detected by the sensors is in the operator commanded body swing path. If the obstacle is in the operator commanded body swing path, the body swing controller adjusts the operator steering commands to avoid collision with the obstacle. If the obstacle is in the operator commanded body swing path, the body swing controller can also determine a time to collision with the obstacle based on the operator steering commands; and only adjust the operator steering commands when the time to collision with the obstacle is below a time threshold.

If the obstacle is in the operator commanded body swing path, the body swing controller can determine an operator requested propel and steer components for the machine based on the operator steering commands. If the operator requested propel component is greater than or equal to a propel threshold, the body swing controller can adjust the operator steering commands to adjust the body swing path to avoid collision with the obstacle. If the operator requested propel component is less than the propel threshold, the body swing controller can adjust the operator steering commands to slow the machine to avoid collision with the obstacle.

If the operator requested propel component is greater than or equal to the propel threshold, the body swing controller can determine a calculated body swing path close to the operator commanded body swing path that avoids collision with the obstacle; maintain the operator requested propel component; calculate a calculated steer component for the calculated body swing path; and adjust the operator steering commands to implement the operator requested propel component and the calculated steer component.

If the operator requested propel component is less than the propel threshold, the body swing controller can maintain the ratio of the operator requested steer and propel components, and reduce both the operator requested steer and propel components to avoid collision with the obstacle.

The body swing controller can communicate with the vehicle controller to monitor the operator steering commands. The body swing controller can send adjusted steering commands for the steerable traction devices to the vehicle controller to avoid collision with the obstacle. The body swing collision avoidance can include an operator override control; and when the operator override control is activated, the body swing controller can be configured to not send adjusted steering commands for the steerable traction devices to the vehicle controller. The operator override control may have to be held down by the operator to remain activated. The sensors can be ultrasonic sensors, radar, cameras or other types of sensors. The sensors can be located on the rear end and the sides of the machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
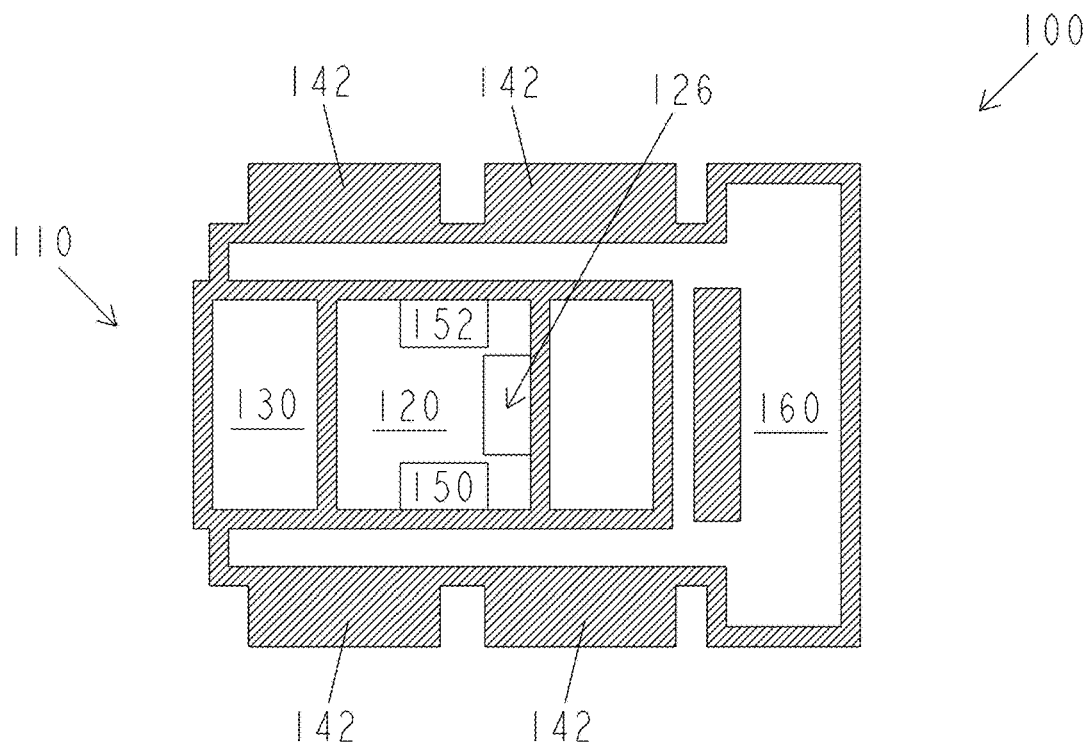
FIG. 1 illustrates an exemplary machine with differential steering.

FIG. 1 illustrates an exemplary machine 100 with differential steering that includes a body 110, an operator cab 120, an engine 130, right and left side traction devices 140, 142, right and left side drive assemblies 150, 152, and an attachment 160. The right and left side traction devices 140, 142 are in contact with the ground on opposite sides of the machine 100 and are used to move the machine 100. The right and left side traction devices 140, 142 can be wheels (as shown), tracks or other traction devices. For example, a skid steer loader has wheels and uses differential steering while a compact track loader has tracks and uses differential steering. In this disclosure, tracks or wheels are used interchangeably to encompass machines with any type of traction devices that can include tracks, wheels or other traction devices. In the machine 100, the right side drive assembly 150 drives the right side traction devices 140, and the left side drive assembly 152 drives the left side traction devices 142, so the traction devices on different sides of the machine 100 can turn at different rates. This can enable the machine 100 to spin on its axis. The drive assemblies 150, 152 can be powered by the engine 130. The operation of the machine 100 and the attachment 160 are controlled from the operator cab 120 using operator controls 126.

Figure 2:
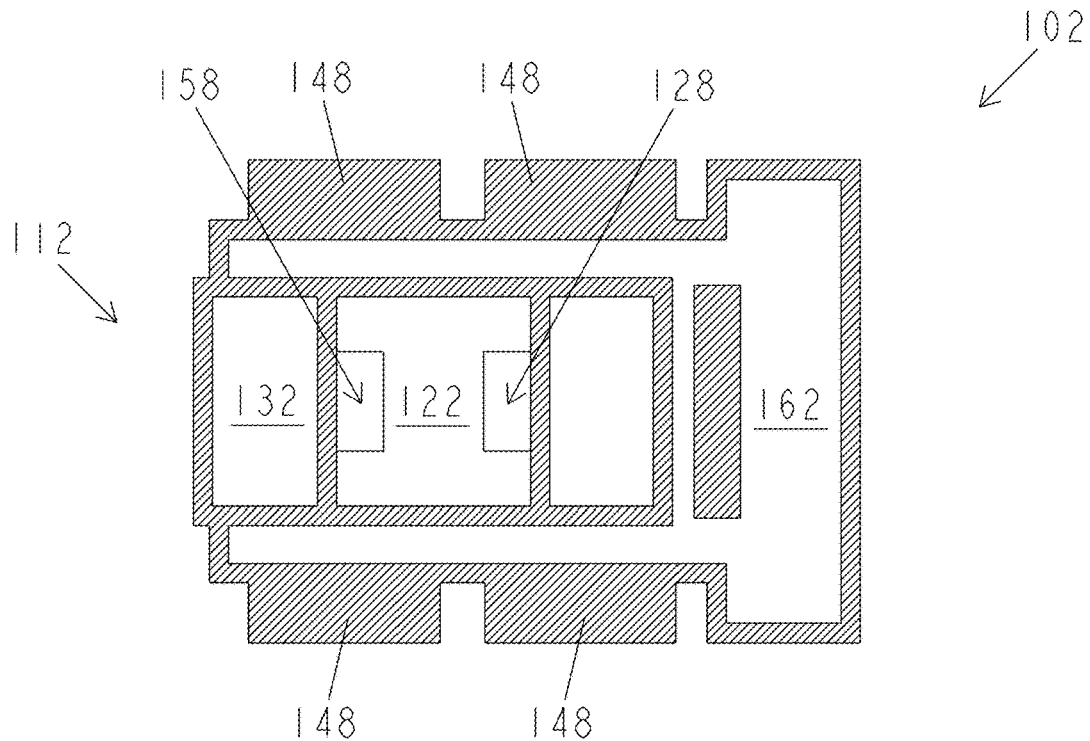
FIG. 2 illustrates an exemplary machine with one or more steerable traction devices.

FIG. 2 illustrates an exemplary machine 102 that includes a body 112, an operator cab 122, an engine 132, traction devices 148, a drive assembly 158, and an attachment 162. The traction devices 148 are in contact with the ground and are used to move the machine 102. The traction devices 148 can be wheels (as shown), tracks or other traction devices.

In the machine 102, the drive assembly 158 drives one or more of the traction devices 148. For example, if the machine 102 has all-wheel drive then the drive assembly 158 drives all of the traction devices 148; or if the machine 102 has front-wheel drive then the drive assembly 158 drives the two front traction devices 148; or if the machine 102 has rear-wheel drive then the drive assembly 158 drives the two rear traction devices 148. The drive assembly 158 can be powered by the engine 130. The operation of the machine 102 and the attachment 162 are controlled from the operator cab 122 using operator controls 128.

The motion of a machine can be thought of as having a propel or radial component, and a steer or transverse component which are commanded by the operator. In this disclosure, propel will be used to mean the substantially radial or forward/backward motion component, and steer will be used to mean the substantially transverse or lateral motion component. For a differentially steered machine, the propel component can be characterized by the average of the speeds of the tracks on both sides, and the steer component can be characterized by the difference of the speeds of the tracks on both sides. The ratio between the propel and steer components at any given moment can be used to determine the path of the body swing of the machine. A larger propel to steer ratio means a smaller body swing, and a smaller propel to steer ratio means a larger body swing.

Figure 3:
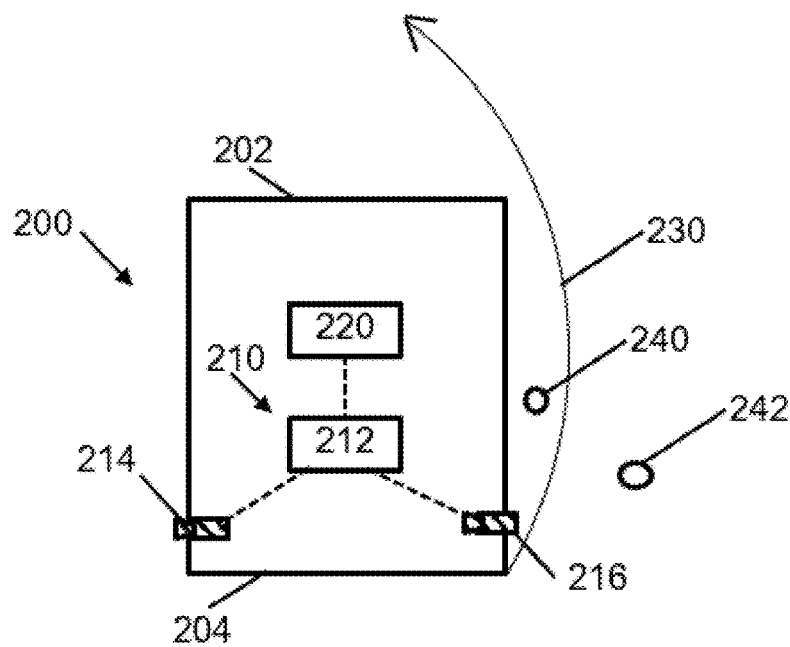
FIG. 3 illustrates an exemplary machine with an exemplary embodiment of a rear body swing collision avoidance system.

FIG. 3 illustrates an exemplary machine 200 having a front end 202 and a rear end 204, that includes a vehicle controller 220 and an embodiment of a rear body swing collision avoidance system 210. The machine 200 can include just the machine, or the machine with an attachment attached to the front or rear. The vehicle controller 220 communicates with the operator controls 122 and sends commands to various systems on the vehicle 200. FIG. 3 also illustrates a rear body swing path 230 of the rear 204 of the machine 200 as it makes a forward left turn. As shown in FIG. 3, when the machine 200 turns, the tail or rear end 204 of the machine 200 will swing out in the opposite direction of the turn.

The rear body swing collision avoidance system 210 includes a rear body swing controller 212, a left rear swing sensor 214 and a right rear swing sensor 216. The rear body swing controller 212 is communicatively coupled to the rear swing sensors 214, 216; and the rear body swing controller 212 is communicatively coupled to the vehicle controller 220. Communication can be wired or wireless. FIG. 3 also illustrates a first obstacle 240 and a second obstacle 242 detected by the rear swing sensors 214, 216.

The rear swing sensors 214, 216 are configured to detect obstacles in the rear body swing path 230 of the rear 204 of the machine 200, and send sensor readings to the rear body swing controller 212. The rear swing sensors 214, 216 can be any of various sensor types for detecting the presence of obstacles, for example ultrasonic sensors, radar, cameras, etc. The rear body swing collision avoidance system 210 can include any number of sensors, including sensors of different types, distributed across the vehicle to detect potential obstacles in a rear body swing path. The rear body swing controller 212 is configured to receive the sensor readings from the rear sensors 214, 216, determine whether an obstacle is in the rear body swing path 230, and if so whether an action should be initiated. The rear body swing controller 212 is also configured to exchange information with the vehicle controller 220. If it is determined that an action should be initiated, the rear body swing controller 212 is configured to send control signals to the vehicle controller 220 to implement the determined action.

In the scenario depicted in FIG. 3, based on the sensor readings received from the right rear swing sensor 216, the rear body swing controller 212 detects obstacles 240, 242 on the right side of the machine 200. Based on information received from the vehicle controller 220, the rear body swing controller 212 determines the operator's current commanded propel and steer components, and based on that the rear body swing controller 212 determines the rear body swing path 230. The rear body swing controller 212 then calculates whether any of the obstacles 240, 242 are in the rear body swing path 230. In this scenario, the rear body swing controller 212 determines that the first obstacle 240 is in the rear body swing path 230 of the machine 200.

When the first obstacle 240 is detected in the rear body swing path 230, the rear body swing collision avoidance system 210 determines whether to perform an action to prevent or mitigate collision between the rear 204 of the machine 200 and the first obstacle 240. Based on the distance to the obstacle 240 in the rear body swing path 230 and the operator's current commanded propel and steer components, the rear body swing controller 212 can determine a time-to-collision (TTC) between the first obstacle 240 and the rear 204 of the machine 200. If the time-to-collision (TTC) is below an action threshold, then the rear body swing controller 212 initiates an action to avoid or mitigate the collision. If the current commanded propel component is less than a propel threshold, then a slow mode can be initiated. If the current commanded propel component is greater than the propel threshold, then an avoid mode can be initiated.

Figure 4:
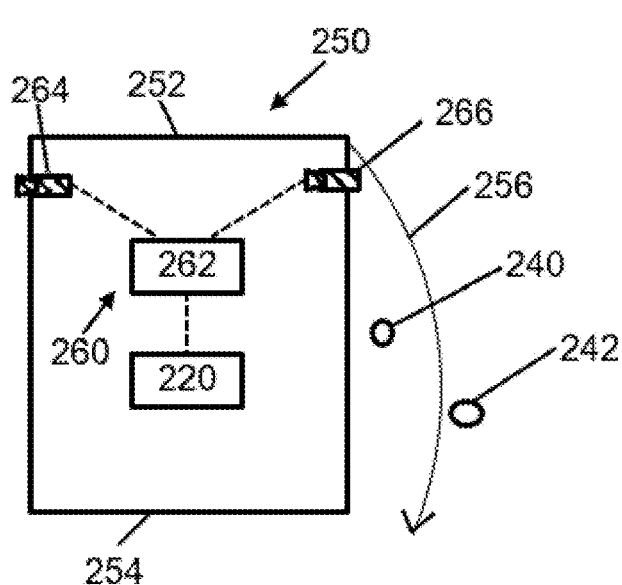
FIG. 4 illustrates an exemplary machine with an exemplary embodiment of a front body swing collision avoidance system.

FIG. 4 illustrates an exemplary machine 250 having a front end 252 and a rear end 254, that includes the vehicle controller 220 and an embodiment of a front body swing collision avoidance system 260. The machine 250 can include just the machine, or the machine with an attachment attached to the front or rear. The vehicle controller 220 communicates with the operator controls 122 and sends commands to various systems on the vehicle 250. FIG. 4 also illustrates a front body swing path 256 of the front 252 of the machine 250 as it makes a rearward right turn. As shown in FIG. 4, when the machine 250 turns, the front or head end 252 of the machine 250 will swing out in the opposite direction of the turn.

The front body swing collision avoidance system 260 includes a front body swing controller 262, a left front swing sensor 264 and a right front swing sensor 266. The front body swing controller 262 is communicatively coupled to the front swing sensors 264, 266; and the front body swing controller 262 is communicatively coupled to the vehicle controller 220. Communication can be wired or wireless. FIG. 4 also illustrates the first obstacle 240 and the second obstacle 242 detected by the front swing sensors 264, 266.

The front swing sensors 264, 266 are configured to detect obstacles in the front body swing path 256 of the front 252 of the machine 250, and send sensor readings to the front body swing controller 262. The front swing sensors 264, 266 can be any of various sensor types for detecting the presence of obstacles, for example ultrasonic sensors, radar, cameras, etc. The front body swing collision avoidance system 260 can include any number of sensors, including sensors of different types, distributed across the vehicle to detect potential obstacles in a front body swing path. The front body swing controller 262 is configured to receive the sensor readings from the front sensors 264, 266, determine whether an obstacle is in the front body swing path 256, and if so whether an action should be initiated. The front body swing controller 262 is also configured to exchange information with the vehicle controller 220. If it is determined that an action should be initiated, the front body swing controller 262 is configured to send control signals to the vehicle controller 220 to implement the determined action.

In the scenario depicted in FIG. 4, based on the sensor readings received from the right front swing sensor 266, the front body swing controller 262 detects obstacles 240, 242 on the right side of the machine 200. Based on information received from the vehicle controller 220, the front body swing controller 262 determines the operator's current commanded propel and steer components, and based on that the front body swing controller 262 determines the front body swing path 256. The front body swing controller 262 then calculates whether any of the obstacles 240, 242 are in the front body swing path 256. In this scenario, the front body swing controller 262 determines that the first obstacle 240 is in the front body swing path 256 of the machine 250.

When the first obstacle 240 is detected in the front body swing path 256, the front body swing collision avoidance system 260 determines whether to perform an action to prevent or mitigate collision between the front 252 of the machine 250 and the first obstacle 240. Based on the distance to the obstacle 240 in the front body swing path 256 and the operator's current commanded propel and steer components, the front body swing controller 262 can determine a time-to-collision (TTC) between the first obstacle 240 and the front 252 of the machine 250. If the time-to-collision (TTC) is below an action threshold, then the front body swing controller 262 initiates an action to avoid or mitigate the collision. If the current commanded propel component is less than a propel threshold, then a slow mode can be initiated. If the current commanded propel component is greater than the propel threshold, then an avoid mode can be initiated.

Figure 5:
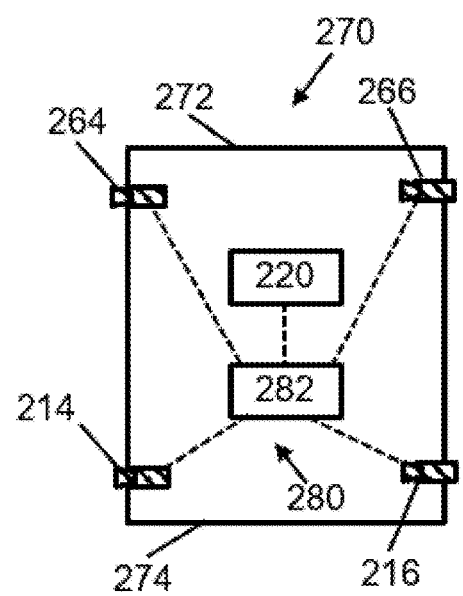
FIG. 5 illustrates an exemplary machine with an exemplary embodiment of a body swing collision avoidance system.

FIG. 5 illustrates an exemplary machine 270 having a front end 272 and a rear end 274, that includes the vehicle controller 220 and an embodiment of a body swing collision avoidance system 280 that covers the entire machine 270. The machine 270 can include just the machine, or the machine with an attachment attached to the front or rear. The vehicle controller 220 communicates with the operator controls 122 and sends commands to various systems on the vehicle 270. The body swing collision avoidance system 280 includes a body swing controller 282, front left and right swing sensors 264, 266 and rear left and right front swing sensors 214, 216. The body swing controller 282 is communicatively coupled to the front and rear swing sensors 214, 216, 264, 266; and the body swing controller 282 is communicatively coupled to the vehicle controller 220. Communication can be wired or wireless.

The front swing sensors 264, 266 are configured to detect obstacles in a commanded front body swing path of the front 272 of the machine 270, and send sensor readings to the body swing controller 282. The rear swing sensors 214, 216 are configured to detect obstacles in a commanded rear body swing path of the rear 274 of the machine 270, and send sensor readings to the body swing controller 282. The body swing collision avoidance system 280 can include any number of sensors, including sensors of different types, distributed across the vehicle to detect potential obstacles in commanded body swing paths. The body swing controller 282 is configured to receive the sensor readings from the front and rear swing sensors 214, 216, 264, 266, determine whether an obstacle is in a commanded body swing path, and if so whether an action should be initiated. The body swing controller 282 is also configured to exchange information with the vehicle controller 220 to determine the commanded body swing path. If it is determined that an action should be initiated, the body swing controller 282 is configured to send control signals to the vehicle controller 220 to implement the determined action.

Figure 6A:
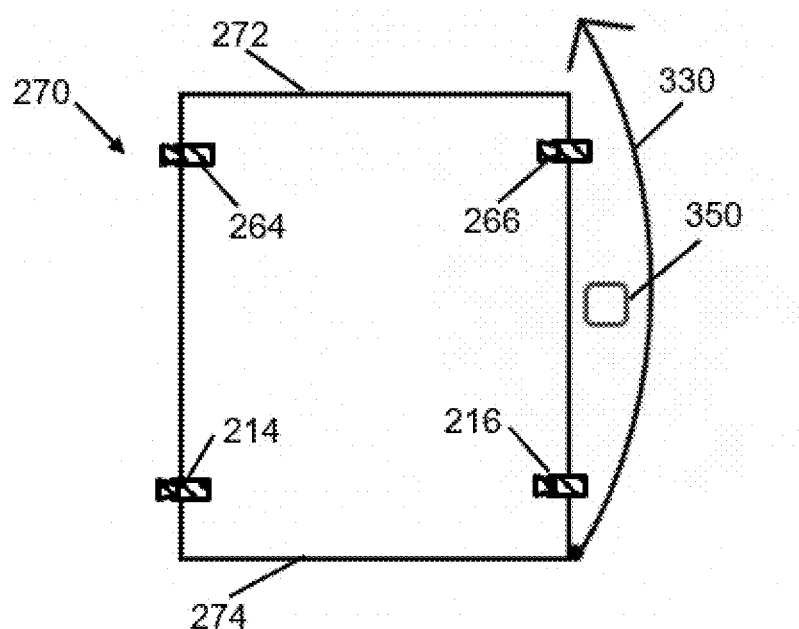
FIG. 6A illustrates an example of the body swing collision avoidance system at the start of slow mode.
Figure 6B:
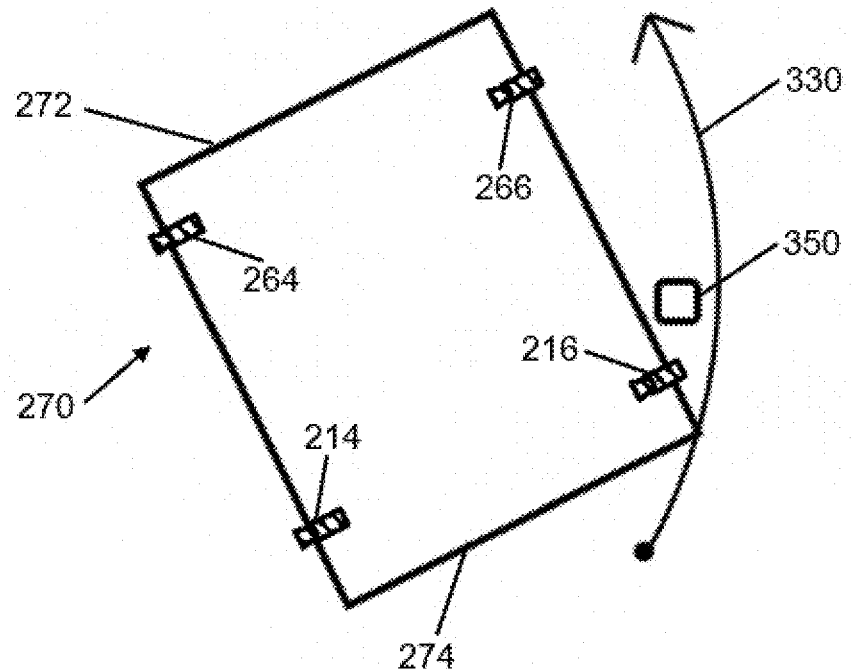
FIG. 6B illustrates the body swing collision avoidance system at the end of slow mode.

FIGS. 6A and 6B illustrate an example of the body swing collision avoidance system 280 for the machine 270 in slow mode. In slow mode, the commanded propel component is less than a propel threshold, so the primary intended motion of the machine 270 is to rotate with less forward motion. The goal of slow mode is to allow the operator's intended steering maneuver (rotation) while slowing the rotation down. Slow mode maintains the operator's intended path while slowing the rotation of the machine 270. Slow mode tries to stop rotation of the machine 270 before collision with the detected obstacle occurs. In FIG. 6A, the body swing collision avoidance system 280 detects an obstacle 350, determines a body swing path 330 based on the current commanded steer and propel components of the operator steering commands, and determines that the rear 274 of the machine 270 will collide with the obstacle 350 on the body swing path 330. The body swing collision avoidance system 280 maintains the ratio of the propel and steer components commanded by the operator but reduces both. In this way, the body swing collision avoidance system 280 does not change the path of the machine 270, but only slows and eventually stops rotation of the machine 270 before collision with the obstacle occurs. FIG. 6B illustrates the result of slow mode, where the body swing path 330 of the machine 270 is maintained but the machine speed is slowed and eventually stopped to avoid collision with the obstacle 350. Slow mode allows the operator to carry out their intended maneuver (rotation) as far as they can without causing a collision with the obstacle. In slow mode, the system stops the vehicle by slowing acceleration and velocity, not by applying the vehicle brakes.

Figure 7A:
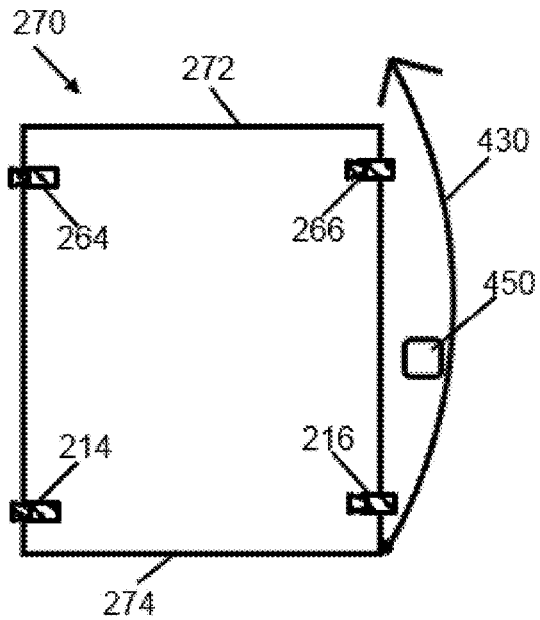
FIG. 7A illustrates the body swing collision avoidance system at the start of avoid mode.
Figure 7B:
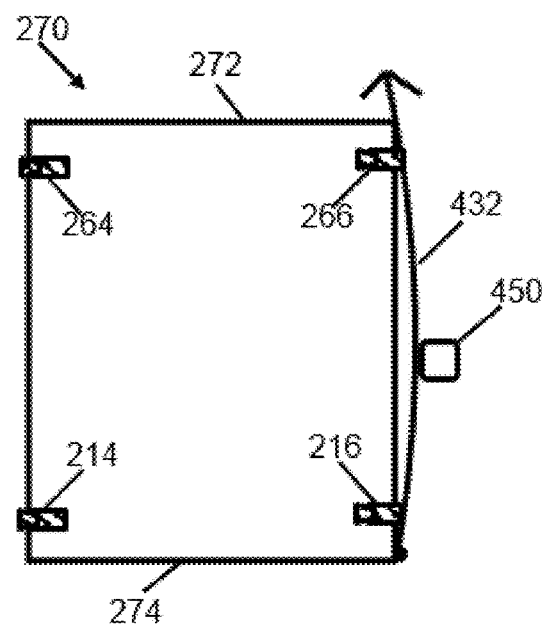
FIG. 7B illustrates the body swing collision avoidance system during avoid mode following reduction of the steer component which creates a modified body swing path.
Figure 7C:
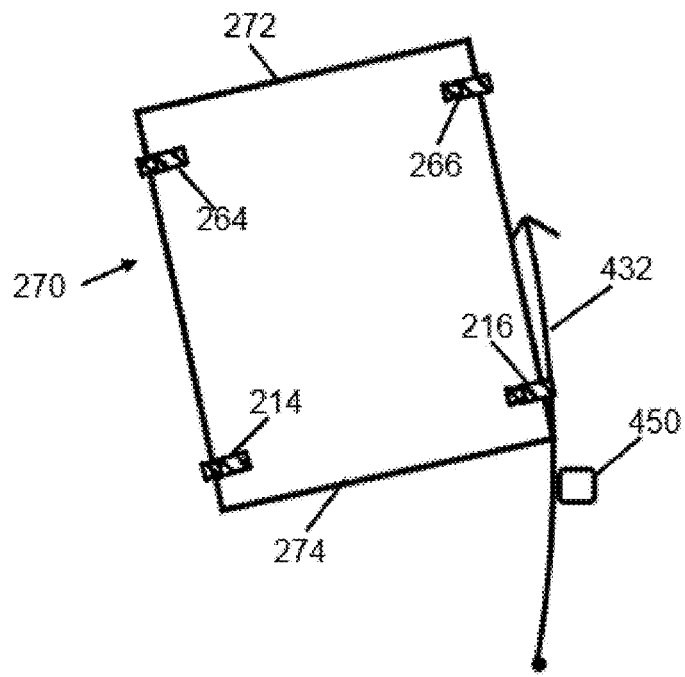
FIG. 7C illustrates the body swing collision avoidance system in avoid mode following avoidance of the obstacle using the modified body swing path.

FIGS. 7A-7C illustrate an example of the body swing collision avoidance system 280 for the machine 270 in avoid mode. In avoid mode, the commanded propel component is greater than the propel threshold, so the primary intent is to move the machine 270 forward/rearward. The goal of avoid mode is to allow the machine to continue moving close to the operator's intended path, while avoiding the obstacle. The avoid mode modifies the operator requested steer component to avoid the detected obstacles without modifying the operator requested propel component. This allows the machine 270 to continue moving with a modified path until the obstacle is cleared. In FIG. 7A, the collision avoidance system 280 detects an obstacle 450, determines a body swing path 430 based on the current commanded steer and propel components of the operator steering commands, and determines that the rear 274 of the machine 270 will collide with the obstacle 450 on the body swing path 430. FIG. 7B illustrates that the avoid mode reduces the steer component which changes the body swing path 430 to a modified body swing path 432 that avoids the obstacle 450. FIG. 7C illustrates the result of avoid mode, where the modified body swing path 432 for the machine 270 is followed and the obstacle 450 is avoided.

Figure 8C:
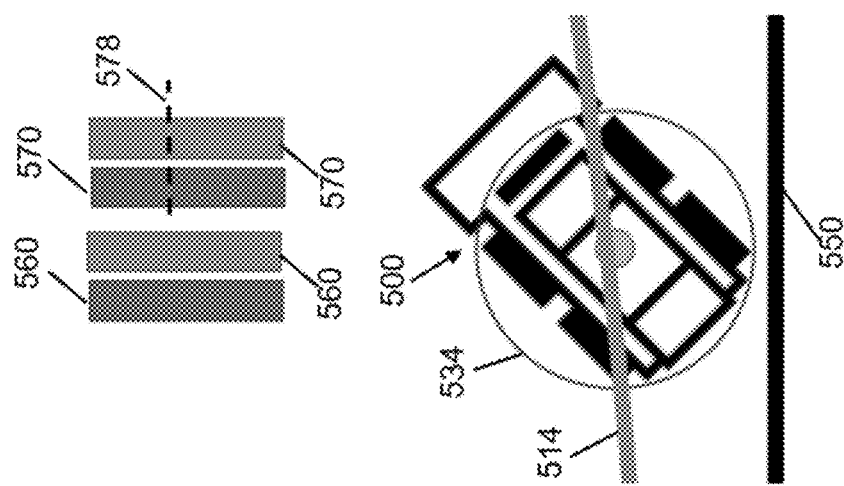
FIG. 8C illustrates the body swing collision avoidance system after avoid mode has avoided the wall.
Figure 8B:
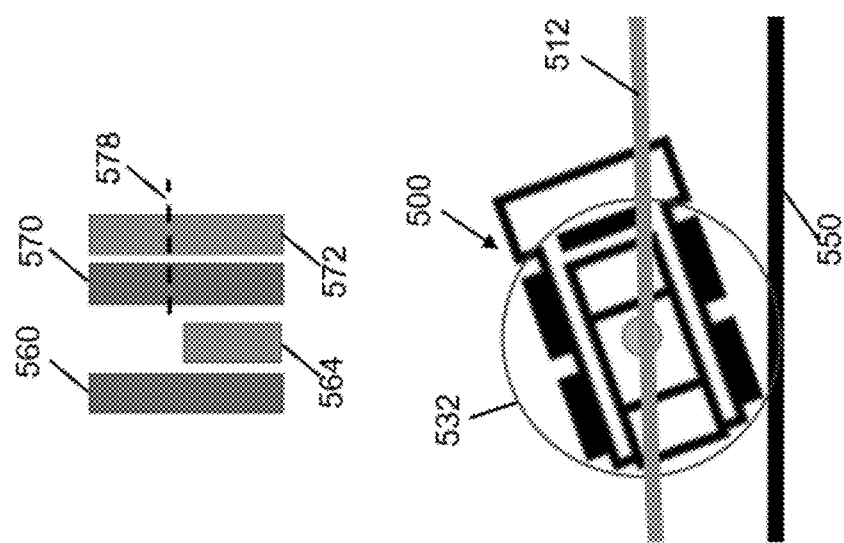
FIG. 8B illustrates the body swing collision avoidance system during avoid mode moving away from the wall.
Figure 8A:
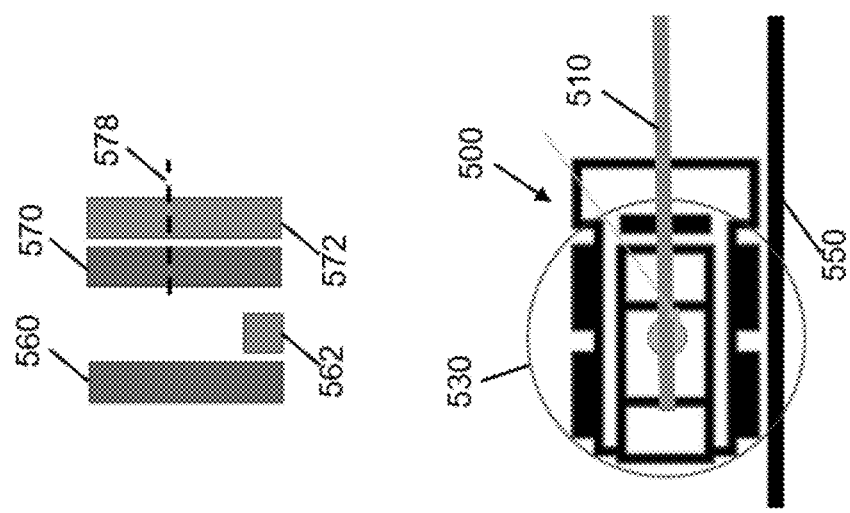
FIG. 8A illustrates the body swing collision avoidance system at the start of avoid mode to avoid a wall.

FIGS. 8A-8C illustrate an example of the body swing collision avoidance system 280 for a machine 500 in avoid mode when the obstacle is a wall 550. In avoid mode, the commanded propel component is greater than a propel threshold, and the goal is to allow the machine 500 to continue moving as close as possible to the operator's intended path, while avoiding the wall 550. The avoid mode modifies the steer component to avoid the wall 550, but allows the machine 500 to continue moving with a modified path until the wall 550 is cleared.

FIG. 8A shows the machine 500 close to the wall 550. The upper portion of FIG. 8A shows a current operator requested steer component 560 and a current operator requested propel component 570 of the operator steering commands and an exemplary propel threshold 578. Based on the current operator requested steer and propel components 560, 570 of the operator steering commands, the body swing collision avoidance system 280 determines a body swing path 530 that causes a collision between the rear of the machine 500 and the wall 550. Since the current operator requested propel component 570 is greater than the propel threshold 578, the body swing collision avoidance system 280 uses avoid mode and computes an initial allowed steer component 562 that avoids collision with the wall 550. The body swing collision avoidance system 280 sends steering commands to the vehicle controller 220 to cause the machine 500 to proceed with the allowed steer component 562 and an unmodified propel component 572, which puts the machine 500 on an initial modified path 510.

FIG. 8B shows the machine 500 moving away from the wall 550. The upper portion of FIG. 8B shows the current operator requested steer component 560 and the current operator requested propel component 570 of the operator steering commands have not changed. Based on the current operator requested steer and propel components 560, 570 of the operator steering commands, the body swing collision avoidance system 280 determines a body swing path 532 that still causes a collision between the rear of the machine 500 and the wall 550. Since the current operator requested propel component 570 is still greater than the propel threshold 578, the body swing collision avoidance system 280 remains in avoid mode. The body swing collision avoidance system 280 computes a subsequent allowed steer component 564 that avoids collision with the wall 550, and sends steering commands to the vehicle controller 220 to cause the machine 500 to proceed with the subsequent allowed steer component 564 and the unmodified propel component 572, which puts the machine 500 on a subsequent modified path 512. Note that as the machine 500 moves further from the wall 550, the avoid mode allows a higher steer component 564 that is closer to the operator requested steer component 560.

FIG. 8C shows the machine 500 moving further away from the wall 550. The upper portion of FIG. 8C shows the current operator requested steer component 560 and the current operator requested propel component 570 of the operator steering commands have not changed. Based on the current operator requested steer and propel components 560, 570 of the operator steering commands, the body swing collision avoidance system 280 determines a body swing path 534 that does not cause a collision between the rear of the machine 500 and the wall 550. The collision with the wall 550 has been avoided. Since no collision is anticipated, the body swing collision avoidance system 280 does not modify the operator requested steer component 560 or the operator requested propel component 570, which puts the machine 500 on an unmodified path 514.

FIGS. 8A-8C illustrate three snapshots in time of the functioning of the body swing collision avoidance system in avoid mode. In actual operation, the body swing collision avoidance system can continuously be computing revised body swing paths and collision estimates in close to real time, and continuously be revising the allowed steer component to approach the operator requested steer component. Avoid mode can be helpful to the operator because it allows them to turn away from walls or other obstacles without worrying about hitting the obstacle or the collision avoidance system stopping them.

A similar concept to the collision avoidance system described herein could be applied to machines that use articulation. In these machines, articulation would be limited by the collision avoidance system to mitigate body swing collisions similar to the way steering is limited in the systems described herein.

Figure 9:
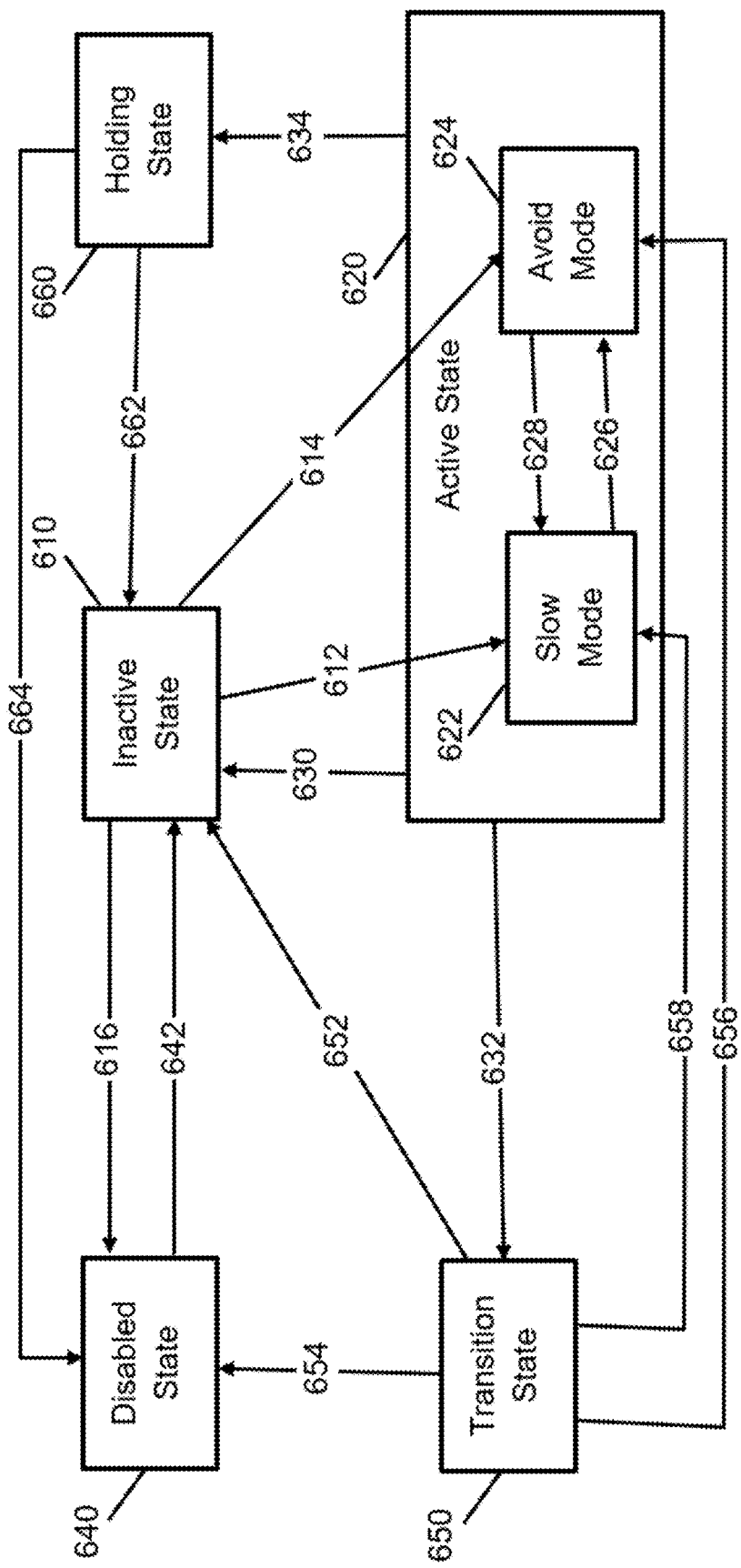
FIG. 9 illustrates an exemplary state diagram for a body swing collision avoidance system.

FIG. 9 illustrates an exemplary state diagram for the body swing collision avoidance system 280. The system starts in an inactive state 610, where no obstacles have been detected in the body swing path and the collision avoidance system is not trying to override operator requested commands.

If an obstacle is detected in the body swing path and the operator requested steering speed exceeds the target steering speed, then the body swing collision avoidance system activates and moves from the inactive state 610 to an active state 620 along one of paths 612 or 614. The target steering speed can be calculated based on the angular distance to the obstacle and a target deceleration rate. If the current steering speed is greater than this target steering speed, then the system can intervene and limit steering to avoid collision. Time To Collision (TTC) is related to this target steering speed as it is calculated from the current speed and the angular distance, but the system can be configured to intervene at different TTC values for different obstacles. If the operator requested propel component is less than a propel threshold, then the system moves from the inactive state 610 to the active state 620 along the path 612 to be in a slow mode state 622. If the operator requested propel component is greater than the propel threshold, then the system moves from the inactive state 610 to the active state 620 along the path 614 to be in an avoid mode state 624.

If while in the inactive state 610, the operator overrides the body swing collision avoidance system 280, then the system moves along a path 616 from the inactive state 610 to a disabled state 640. Several methods can be implemented to enable the operator to override the body swing collision avoidance system 280, for example by having an override button as part of the operator controls 122 in the cab 120, and allowing the operator to override the body swing collision avoidance system 280 by holding down the override button.

In the slow mode state 622, the system modifies the operator requested steer and propel commands so the machine performs the operator's intended maneuver (rotation) while slowing and eventually stopping to avoid collision. If while in the slow mode state 622, the operator requested propel component becomes greater than the propel threshold, the system moves along a path 626 from the slow mode state 622 to the avoid mode state 624.

In the avoid mode state 624, the system modifies the operator requested steer component of the steering commands so the machine continues moving close to the operator's intended path, while avoiding the obstacle. If while in the avoid mode state 624, the operator requested propel component becomes less than the propel threshold, the system moves along a path 628 from the avoid mode state 624 to the slow mode state 622.

If while in the active state 620, in either of the slow mode state 622 or the avoid mode state 624, the machine velocity goes to zero and the operator puts the machine in neutral then the body swing collision avoidance system moves back to the inactive state 610 from the active state 620 along the path 630.

If while in the active state 620, in either of the slow mode state 622 or the avoid mode state 624, no obstacles are any longer detected in the body swing path or the operator overrides the body swing collision avoidance system 280, then the collision avoidance system moves from the active state 620 along the path 632 to a transition state 650.

If while in the active state 620, in either of the slow mode state 622 or the avoid mode state 624, the machine velocity goes to zero but the machine is not in neutral then the body swing collision avoidance system moves from the active state 620 along the path 634 to a holding state 660.

In the disabled state 640, the system does not modify the operator requested steering commands. If while in the disabled state 640, the operator is not overriding the collision avoidance system 280 and no faults are detected with the collision avoidance system 280, then control moves from the disabled state 640 to the inactive state 610 along the path 642.

In the transition state 650, the system allows the machine to accelerate to the operator requested speed at limited acceleration. If while in the transition state 650, the machine velocity matches the operator requested velocity and the operator is not overriding the collision avoidance system 280, then control moves from the transition state 650 to the inactive state 610 along the path 652. If while in the transition state 650, the machine velocity matches the operator requested velocity and the operator is overriding the collision avoidance system 280, then control moves from the transition state 650 to the disabled state 640 along the path 654.

If while in the transition state 650, the operator requested propel component is greater than the propel threshold, and the steering speed exceeds the target steering speed, and the operator is not overriding the collision avoidance system, then the system moves from the transition state 650 to the active state 620 along the path 656 to be in the avoid mode state 624. If while in the transition state 650, the operator requested propel component is less than the propel threshold, and the steering speed exceeds the target steering speed, and the operator is not overriding the collision avoidance system, then the system moves from the transition state 650 to the active state 620 along the path 658 to be in the slow mode state 622.

In the holding state 660, the system commands vehicle speed to zero. If while in the holding state 660, the operator shifts the machine into neutral, then control moves from the holding state 660 to the inactive state 610 along the path 662. If while in the holding state 660, the operator starts overriding the collision avoidance system 280, then control moves from the holding state 660 to the disabled state 640 along the path 664.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A body swing collision avoidance method for a machine including a body and having steerable traction devices for moving the machine, the machine also having a front end and a rear end, the method comprising:
   monitoring obstacles around the body of the machine using sensors;
   monitoring an operator steering command for the steerable traction devices;
   calculating an operator commanded body swing path for the body of the machine based on the operator steering command for the steerable traction devices, wherein the operator steering command includes an operator requested propel component and an operator requested steer component;
   determining whether an obstacle detected by the sensors is in the operator commanded body swing path; and
   automatically adjusting the operator steering command for the steerable traction devices to avoid collision of the body of the machine with the obstacle in the operator commanded body swing path, wherein a ratio between the operator requested propel component and the operator requested steer component determines an adjusted body swing path.

2. The body swing collision avoidance method of claim 1, wherein automatically adjusting the operator steering command for the steerable traction devices to avoid collision of the body of the machine with the obstacle comprises:
   determining a time to collision with the obstacle based on the operator steering command for the steerable traction devices; and
   automatically adjusting the operator steering command for the steerable traction devices to avoid collision of the body of the machine with the obstacle based on the time to collision being below a time threshold.

3. The body swing collision avoidance method of claim 1, wherein automatically adjusting the operator steering command for the steerable traction devices to avoid collision of the body of the machine with the obstacle comprises:
   adjusting, based on the propel component being greater than or equal to a propel threshold, the operator steering command for the steerable traction devices to adjust the body swing path to avoid collision with the obstacle; and
   adjusting, based on the operator requested propel component being less than the propel threshold, the operator steering command for the steerable traction devices to slow the machine to avoid collision with the obstacle of the body of the machine.

4. The body swing collision avoidance method of claim 3, wherein automatically adjusting the operator steering command for the steerable traction devices to adjust the body swing to avoid collision of the body of the machine with the obstacle comprises:
   determining a calculated body swing path close to the operator commanded body swing path that avoids collision with the obstacle;
   maintaining the operator requested propel component;
   calculating a steer component for the calculated body swing path; and
   adjusting the operator steering command for the steerable traction devices to implement the operator requested propel component and the calculated steer component.

5. The body swing collision avoidance method of claim 4, wherein automatically adjusting the operator steering command for the steerable traction devices to slow the machine to avoid collision of the body of the machine with the obstacle comprises:
maintaining the ratio of the operator requested steer component and the operator requested propel component; and
reducing both the operator requested steer component and the operator requested propel component to avoid collision of the body of the machine with the obstacle.

6. The body swing collision avoidance method of claim 3, wherein automatically adjusting the operator steering command for the steerable traction devices to slow the machine to avoid collision of the body of the machine with the obstacle comprises:
maintaining the ratio of the operator requested steer component and the operator requested propel component; and
reducing both the operator requested steer component and the operator requested propel component to avoid collision of the body of the machine with the obstacle.

7. The body swing collision avoidance method of claim 3, wherein automatically adjusting the operator steering command for the steerable traction devices to adjust the body swing to avoid collision of the body of the machine with the obstacle comprises:
continuously monitoring the operator steering command for the steerable traction devices;
continuously calculating the operator commanded body swing path for the machine based on the latest operator steering command for the steerable traction devices;
continuously determining whether the obstacle is in the latest operator commanded body swing path;
identifying the obstacle in the latest operator commanded body swing path:
continuously determining, based on the identified obstacle, a latest calculated body swing path close to the latest operator commanded body swing path that avoids collision of the body of the machine with the obstacle;
continuously calculating, based on the identified obstacle, a steer component for the latest calculated body swing path; and
continuously adjusting, based on the identified obstacle, the operator steering command for the steerable traction devices to implement the operator requested propel component and the latest calculated steer component.

8. The body swing collision avoidance method of claim 1, further comprising:
checking for an operator override command; and
when the operator override command is detected, not adjusting the operator steering command for the steerable traction devices to avoid collision of the body of the machine with the obstacle.

9. A body swing collision avoidance system for a machine including a body and that has steerable traction devices to move the body of the machine, and the body of the machine having a front end and a rear end, and a vehicle controller, the body swing collision avoidance system comprising:
sensors configured to detect obstacles around the body of the machine;
a body swing controller configured to monitor an operator steering command for the steerable traction devices, wherein the operator steering command includes an operator requested propel component and an operator requested steer component, calculate an operator commanded body swing path for the body of the machine based on the operator steering command for the steerable traction devices, and determine whether an obstacle detected by the sensors is in the operator commanded body swing path;
wherein the body swing controller is configured to adjust the operator steering command for the steerable traction devices to avoid collision of the body of the machine with the obstacle in the operator commanded body swing path, wherein a ratio between the operator requested propel component and the operator requested steer component determines an adjusted body swing path.

10. The body swing collision avoidance system of claim 9, wherein the body swing controller is configured to determine a time to collision of the body of the machine with the obstacle in the operator commanded body swing path based on the operator steering command for the steerable traction devices; and only adjust the operator steering command for the steerable traction devices when the time to collision of the body of the machine with the obstacle is below a time threshold.

11. The body swing collision avoidance system of claim 9, wherein the body swing controller is configured, based on the obstacle being in the operator commanded body swing path, to determine the operator requested propel component and the operator requested steer component for the machine based on the operator steering command for the steerable traction devices;
the body swing controller, based on the operator requested propel component being greater than or equal to a propel threshold, is configured to adjust the operator steering command for the steerable traction devices to adjust the body swing path to avoid collision of the body of the machine with the obstacle; and
the body swing controller, based on the operator requested propel component being less than the propel threshold, is configured to adjust the operator steering command for the steerable traction devices to slow the machine to avoid collision of the body of the machine with the obstacle.

12. The body swing collision avoidance system of claim 11, wherein the body swing controller is configured, based on the operator requested propel component being greater than or equal to the propel threshold, to determine a calculated body swing path close to the operator commanded body swing path that avoids collision of the body of the machine with the obstacle; maintain the operator requested propel component; calculate a calculated steer component for the calculated body swing path; and adjust the operator steering command for the steerable traction devices to implement the operator requested propel component and the calculated steer component.

13. The body swing collision avoidance system of claim 12, wherein the body swing controller is configured, based on the operator requested propel component being less than the propel threshold, to maintain the ratio of the operator requested steer component and the operator requested propel component, and reduce both the operator requested steer component and the operator requested propel component to avoid collision of the body of the machine with the obstacle.

14. The body swing collision avoidance system of claim 11, wherein the body swing controller is configured, based on the operator requested propel component being less than the propel threshold, to maintain the ratio of the operator requested steer component and the operator requested propel component, and reduce both the operator requested steer component and the operator requested propel component to avoid collision of the body of the machine with the obstacle.

15. The body swing collision avoidance system of claim 9, wherein the body swing controller is configured to communicate with the vehicle controller to monitor the operator steering command for the steerable traction devices.

16. The body swing collision avoidance system of claim 9, wherein the body swing controller is configured to send the adjusted steering command for the steerable traction devices to the vehicle controller to avoid collision of the body of the machine with the obstacle.

17. The body swing collision avoidance system of claim 16, further comprising an operator override control; and when the operator override control is activated, the body swing controller is configured to not send adjusted steering command for the steerable traction devices to the vehicle controller.

18. The body swing collision avoidance system of claim 17, wherein the operator override control must be held down by the operator to remain activated.

19. The body swing collision avoidance system of claim 9, wherein the sensors are ultrasonic sensors.

20. The body swing collision avoidance system of claim 9, wherein the sensors are located on the rear end and the sides of the body of the machine.

* * * * *